United States Patent
Yang (10) Patent No.: US 11,744,196 B2
(45) Date of Patent: Sep. 5, 2023

(54) PLANT CULTIVATING APPARATUS

(71) Applicant: LG ELECTRONICS INC., Seoul (KR)

(72) Inventor: Mina Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/122,580

(22) Filed: Dec. 15, 2020

(65) Prior Publication Data
US 2021/0185949 A1 Jun. 24, 2021

(30) Foreign Application Priority Data
Dec. 18, 2019 (KR) .......................... 10-2019-0169743

(51) Int. Cl.
*A01G 27/04* (2006.01)
*A01G 31/06* (2006.01)

(52) U.S. Cl.
CPC ............. *A01G 27/04* (2013.01); *A01G 31/06* (2013.01)

(58) Field of Classification Search
CPC ........ A01G 27/04; A01G 27/00; A01G 31/06; A01G 31/02; A01G 31/00
See application file for complete search history.

(56) References Cited

U.S. PATENT DOCUMENTS

| | | | | |
|---|---|---|---|---|
| 3,683,548 A | * | 8/1972 | Hagerty | A01G 27/04 47/81 |
| 3,786,598 A | * | 1/1974 | Stadelhofer | A01G 27/04 47/81 |
| 4,052,818 A | * | 10/1977 | Hagerty | A01G 27/04 47/81 |
| 4,407,092 A | * | 10/1983 | Ware | A01G 31/02 47/64 |
| 4,741,125 A | * | 5/1988 | Demorest | A01G 27/06 47/81 |

(Continued)

FOREIGN PATENT DOCUMENTS

| | | |
|---|---|---|
| CN | 108093986 | 6/2018 |
| KR | 1020190132786 | 11/2019 |
| WO | WO2016180017 | 11/2016 |

OTHER PUBLICATIONS

EP Partial European Search Report in European Appln. No. 20212457.4, dated Jul. 5, 2021, 14 pages.

*Primary Examiner* — Joshua D Huson
*Assistant Examiner* — Megan J Moroney
(74) *Attorney, Agent, or Firm* — Fish & Richardson P.C.

(57) ABSTRACT

A plant cultivating apparatus according to some embodiments of the present disclosure includes a main body, a shelf, and a cultivation container. The cultivation container has a medium formed therein and is supplied with water from the shelf. Specifically, the main body has a cultivation space of a predetermined size formed therein. The shelf is configured to supply and discharge water to and from the cultivation space. The cultivation container is placed to be supported on the shelf, and configured to receive or discharge water from or to the shelf. The cultivation container includes a water flow guide protruding downward from a bottom surface of the cultivation container and having an opening formed at the protruded lower end, and a wick accommodated inside the water flow guide and configured to absorb and hold water introduced through the opening.

6 Claims, 6 Drawing Sheets

(56) References Cited

U.S. PATENT DOCUMENTS

| | | | | |
|---|---|---|---|---|
| 4,858,381 | A * | 8/1989 | Walton | A01G 27/04 47/79 |
| 4,999,947 | A * | 3/1991 | Whitaker | A01G 27/04 47/81 |
| 5,193,305 | A * | 3/1993 | Holtkamp, Jr. | A01G 27/04 47/81 |
| 6,321,487 | B1 * | 11/2001 | Sardanelli | A01G 27/04 47/81 |
| 6,691,460 | B1 * | 2/2004 | Lee | A01G 27/02 47/79 |
| 7,040,055 | B2 * | 5/2006 | Nielsen | A01G 27/04 47/80 |
| 8,112,936 | B1 * | 2/2012 | Maslin | A01G 24/46 47/79 |
| 8,448,380 | B1 * | 5/2013 | Yang | A01G 27/04 47/79 |
| 8,910,419 | B1 * | 12/2014 | Oberst | A01G 31/06 47/60 |
| 9,241,452 | B2 * | 1/2016 | Stewart, Jr. | A01G 27/06 |
| 11,058,070 | B2 * | 7/2021 | Loessl | A01G 25/16 |
| 11,064,659 | B2 * | 7/2021 | Loessl | A01G 9/00 |
| 11,154,020 | B2 * | 10/2021 | Loessl | A01G 9/26 |
| 11,206,772 | B2 * | 12/2021 | McKenna | A01G 24/30 |
| 2010/0132255 | A1 * | 6/2010 | Webber | A01G 9/023 47/29.1 |
| 2017/0105368 | A1 | 4/2017 | Mehrman | |
| 2017/0172082 | A1 * | 6/2017 | Weiss | A01G 31/02 |
| 2020/0163283 | A1 * | 5/2020 | Aminpour | A01G 9/26 |
| 2021/0100173 | A1 * | 4/2021 | Khwaja | A01G 9/247 |

* cited by examiner

PLANT CULTIVATING APPARATUS

CROSS-REFERENCE TO RELATED APPLICATION

This application claims benefit of priority to Korean Patent Application No. 10-2019-0169743, entitled "PLANT CULTIVATING APPARATUS" and filed on Dec. 18, 2019, in the Korean Intellectual Property Office, the entire disclosure of which is incorporated herein by reference.

TECHNICAL FIELD

The present disclosure relates to a plant cultivating apparatus, and, more particularly, to a plant cultivating apparatus configured not to generate green algae inside the plant cultivating apparatus while helping germination of plants.

BACKGROUND

In cities, buildings are very dense. Accordingly, there are not enough places to cultivate plants in cities.

In addition, in cities, apartment-type residential culture has been established, and thus the number of houses with yards or vegetable gardens is very small.

On the other hand, due to problems of fine dust or environmental pollution, interest in cultivating plants used as food materials at home has been increasing in recent years.

Accordingly, even in houses that do not have yards or vegetable gardens, there is an increasing demand for pots or apparatuses capable of cultivating the plants inside residential spaces.

Pots are not suitable for cultivating plants that are sensitive to temperature or humidity.

Plant cultivating apparatuses may set environmental factors such as temperature or humidity required for a specific plant. Accordingly, when the plant cultivating apparatus is used, it becomes possible to germinate and cultivate desired plants, even indoors.

Usually, in order for seeds to germinate, various environmental factors have to be set appropriately. To this end, existing plant cultivating apparatuses were able to precisely control humidity and temperature in order to germinate the seeds. In addition, a cover was used not only to cover and protect the seeds but also to maintain over-humidity, until the seeds germinate.

However, such a cover helps to germinate the seeds, but also promotes the occurrence of green algae. As a result, the existing plant cultivating apparatuses have a disadvantage in that green algae are generated therein.

In this regard, in Korean Patent Application Publication No. 10-2019-0132786 (published on Nov. 29, 2019; hereinafter referred to as "related art"), disclosed is a plant cultivating apparatus. In the related art, a space in which plants may be cultivated is formed inside the plant cultivating apparatus. Further, in the related art, disclosed is a structure in which ventilation is smoothly performed.

However, when a ventilation facility provided in the plant cultivating apparatus is operated, germination of seeds may be impeded. This is because when ventilation is performed, an environment required for the germination of the seeds cannot be maintained. As a result, since an inner space of the plant cultivating apparatus has to be maintained in a high-temperature and over-humid state so as to germinate the seeds, green algae are likely to occur in the inner space of the plant cultivating apparatus.

The above-described related art is technical information that the inventors have held for the derivation of the present disclosure or that the inventors acquired in the process of deriving the present disclosure. Thus, the above-described related art cannot be regarded as known technology disclosed to the general public prior to the filing of the present application.

SUMMARY

The present disclosure is directed to addressing a disadvantage in the art in which seeds are covered with a separate protective cover so as to germinate the seeds.

The present disclosure is further directed to addressing a disadvantage in the art in which when a protective cover is not removed at the right time, green algae occur in a place where plants grow.

The present disclosure is still further directed to addressing a disadvantage in the art in which nutrients required for the growth of plants have to be supplied separately.

The present disclosure is not limited to the contents mentioned above, and other contents not mentioned may be understood by the following description.

Particular implementations of the present disclosure provide a plant cultivating apparatus that includes a main body, at least one shelf, and a cultivation container. The main body may define a cultivation space and include a door configured to open or close the cultivation space. The at least one shelf may be disposed at the cultivation space. The cultivation container may be supported on the at least one shelf and configured to receive water from or discharge water to the at least one shelf. The cultivation container is configured to contain a medium. The cultivation container may include a water flow guide and a wick. The water flow guide may protrude downward from a bottom surface of the cultivation container. A lower end of the water flow guide may define an opening. The wick may be received in the water flow guide and configured to absorb water introduced through the opening of the lower end of the water flow guide. The wick may be configured to deliver the water supplied from the at least one shelf to the medium at the cultivation container.

In some implementations, the apparatus can optionally include one or more of the following features. The wick includes a nutrient solution that includes nutrients for growth of plants in water. The medium may include a first medium that is contained in the cultivation container, a sowing part that covers a top surface of the first medium and is configured to allow seeds of plants to be planted, and a second medium that covers a top surface of the sowing part. Sizes of particles in the second medium may be smaller than sizes of particles in the first medium. The wick may extend from the lower end of the water flow guide to the second medium below a top surface of the second medium. An upper end of the wick may be located in the second medium. The wick may include a shield that surrounds a portion of an outer circumference of the wick and that is impervious to water. The portion of the outer circumference of the wick may contact the first medium and the sowing part. The second medium may be thinner than the sowing part in the cultivation container. The main body may include a humidity sensor that is disposed at the main body and configured to measure humidity in the cultivation space of the main body. The main body may include a humidity controller that is configured to control humidity in the main body. The at least one shelf may include a temperature controller configured to control temperature in the cultivation container loaded on the shelf. The at least one shelf may include a plurality of shelves that are spaced apart from one another in a vertical direction.

Particular implementations of the present disclosure provide a plant cultivating apparatus that may include a main body and a cultivation container. The main body may define a cultivation space and be configured to control temperature and humidity in the cultivation space. The cultivation container may be accommodated in the main body. The cultivation container may include a first medium that is disposed inside the cultivation container, a sowing part that covers a top surface of the first medium and is thinner than the first medium, and a second medium that covers a top surface of the sowing part and is thinner than the sowing part.

In some implementations, the apparatus can optionally include one or more of the following features. Sizes of particles in the second medium may be smaller than sizes of particles in the first medium. The plant cultivating apparatus may include a wick that is disposed in the cultivation container and configured to absorb water. The wick may extend from the first medium to the second medium below a top surface of the second medium. An upper end of the wick may be located in the second medium. The wick may include a shield that surrounds a portion of an outer circumference of the wick and may be impervious to water. The portion of the outer circumference of the wick may contact the first medium and the sowing part. The main body may include a humidity sensor that is disposed at the main body and configured to measure humidity in the cultivation space of the main body. The main body may include a humidity controller that is configured to control humidity in the main body. The wick may include a nutrient solution that includes nutrients for growth of plants in water. The plant cultivating apparatus may include a temperature controller configured to control temperature in the cultivation container.

A plant cultivating apparatus according to some embodiments of the present disclosure includes a main body, a shelf, and a cultivation container. The cultivation container has a medium formed therein and is supplied with water from the shelf Specifically, the main body has a cultivation space of a predetermined size formed therein, and includes a door configured to open or close the cultivation space. The shelf is configured to supply and discharge water to and from the cultivation space. The cultivation container is placed to be supported on the shelf, and configured to receive or discharge water from or to the shelf. The cultivation container contains the medium therein.

The cultivation container includes a water flow guide protruding downward from a bottom surface of the cultivation container and having an opening formed at the protruded lower end, and a wick accommodated inside the water flow guide and configured to absorb and hold water introduced through the opening.

In the plant cultivating apparatus according to some embodiments of the present disclosure, the wick is impregnated with a nutrient solution obtained by dissolving nutrients required for the growth of plants in water.

In the plant cultivating apparatus according to some embodiments of the present disclosure, the medium includes a first medium contained in the cultivation container, a sowing part configured to cover a top surface of the first medium and to allow seeds of plants to be planted, and a second medium configured to cover a top surface of the sowing part.

In the plant cultivating apparatus according to some embodiments of the present disclosure, sizes of particles forming the second medium are smaller than those of particles forming the first medium.

In the plant cultivating apparatus according to some embodiments of the present disclosure, the wick is disposed from the opening to the second medium without extending beyond the second medium.

In the plant cultivating apparatus according to some embodiments of the present disclosure, an upper end of the wick is received inside the second medium.

In the plant cultivating apparatus according to some embodiments of the present disclosure, the wick includes a shield that surrounds a portion of an outer circumference of the wick and that is impervious to water. The shield is formed to surround the outer circumference of the wick at a section where the wick passes through the first medium and the sowing part.

In the plant cultivating apparatus according to some embodiments of the present disclosure, the second medium is formed to have a thickness thinner than that of the sowing part.

In the plant cultivating apparatus according to some embodiments of the present disclosure, the main body has a humidity sensor provided therein and configured to measure humidity in the cultivation space, and a humidity controller configured to control humidity in the main body.

In the plant cultivating apparatus according to some embodiments of the present disclosure, the shelf includes a temperature controller configured to control temperature in the cultivation container loaded thereon.

In the plant cultivating apparatus according to some embodiments of the present disclosure, the shelf is provided in plural number, and a plurality of shelves are provided to be spaced apart from one another in a vertical direction.

A plant cultivating apparatus according to some embodiments of the present disclosure includes a main body having a cultivation space formed therein and configured to control temperature and humidity in the cultivation space, and a cultivation container accommodated in the main body, wherein the cultivation container includes a first medium disposed therein, a sowing part covering a top surface of the first medium and formed to have a thickness thinner than that of the first medium, and a second medium covering a top surface of the sowing part and formed to have a thickness thinner than that of the sowing part.

According to the present disclosure, a structure of an apparatus for germinating seeds is simplified, and management of the apparatus is also convenient.

According to the present disclosure, even when a humid environment is created, green algae do not easily occur.

According to the present disclosure, since nutrients required for the growth of plants are supplied together with water, it is easier to nourish the cultivated plants, and the required nutrients are also supplied uniformly.

The effects of the present disclosure are not limited to those mentioned above, and other effects are not mentioned will be clearly understood by those skilled in the art from the following description.

DETAILED DESCRIPTION

Hereinafter, the embodiments of the present disclosure as described above will be described in detail with reference to the accompanying drawings. The like reference numerals refer to the like components throughout the detailed description.

Figure 1:
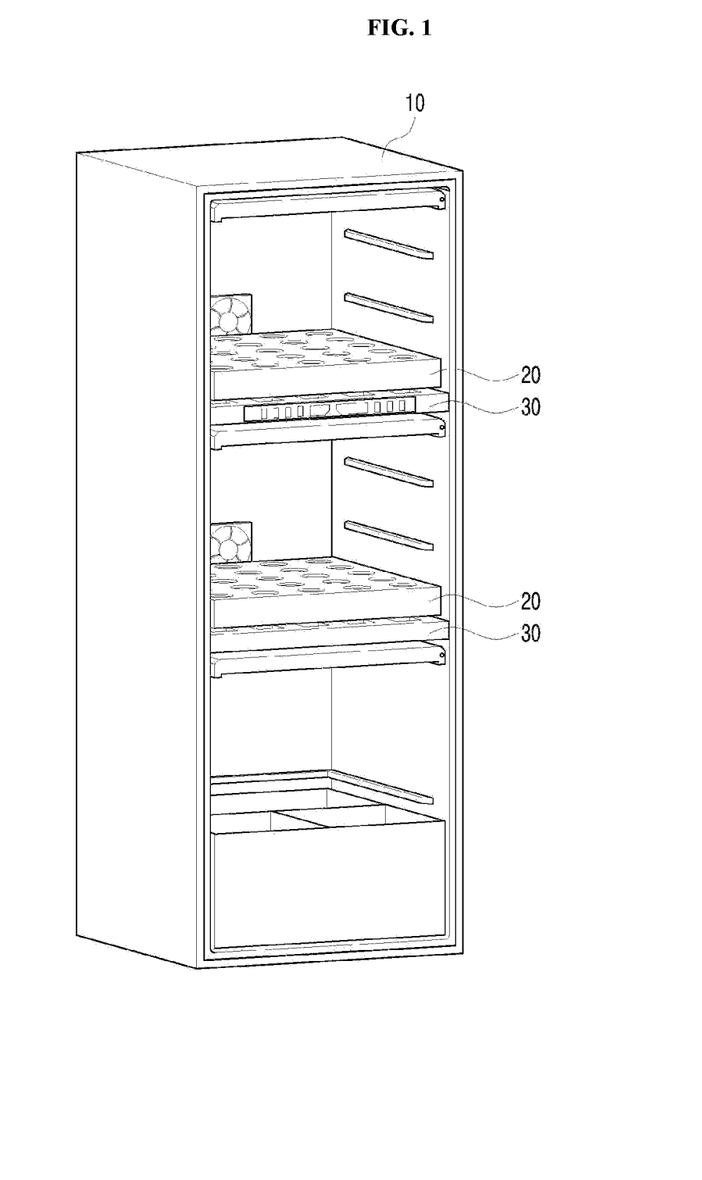
FIG. 1 is a perspective view of a plant cultivating apparatus according to some embodiments of the present disclosure.

FIG. 1 is a perspective view illustrating a plant cultivating apparatus according to some embodiments of the present disclosure.

As illustrated in FIG. 1, a plant cultivating apparatus according to some embodiments of the present disclosure includes a main body 10, a shelf 30, and a cultivation container 20. The cultivation container 20 includes a medium, a flow path guide (water flow guide) 110, and a wick 114.

The wick 114 delivers water supplied from the shelf 30 to the medium.

The main body 10 has a predetermined space therein. The predetermined space is a cultivation space in which plants are accommodated and grown. An environment in which the plants may be cultivated is created in the cultivation space. The main body 10 may have various sizes and shapes.

According to some embodiments of the present disclosure, as illustrated in FIG. 1, the main body 10 may be formed in a rectangular parallelepiped, and has a cultivation space formed therein. The cultivation space has a door, and may be opened or closed through the door.

At least a portion of the door may be formed of a transparent material. Accordingly, a user may observe the cultivation space from outside through the transparent portion of the door.

The door may have a locking device. The locking device of the door may be set to unlock when a state of the cultivation space satisfies a predetermined condition. This is to prevent a situation in which seeds cannot germinate due to the door being opened due to the user's carelessness during the germinating period, which is an important period for the growth of the plants. According to the embodiment to which the present disclosure is applied, the main body 10 and the door may be implemented in various shapes and materials.

The main body 10 includes a device configured to ventilate the cultivation space. Ventilation is performed in a manner in which air in the cultivation space is discharged to the outside or outside air is introduced into the cultivation space.

The shelf 30 is disposed in the cultivation space. The shelf 30 is provided in plural number. The shelf 30 is formed in a structure that crosses the cultivation space horizontally. The cultivation container 20 is placed on the shelf 30. The shelf 30 supports the load of the cultivation container 20 and supplies water to the cultivation container 20. A passage through which water is discharged from the cultivation container 20 is also provided on the shelf 30.

A plurality of shelves 30 are stacked on top of one another in the cultivation space so as to be arranged at a predetermined distance from one another. In addition, at least one cultivation container 20 is seated on each of the shelves 30.

The shelf 30 includes a temperature controller. The temperature controller controls temperature in the cultivation container 20 that is seated on the shelf 30. In addition, the shelf 30 may further include a humidity controller. The humidity controller controls an amount of water supplied to the cultivation container 20.

In addition, the main body 10 includes at least one of a humidity sensor or a temperature sensor. The humidity sensor measures humidity in the cultivation space, and the temperature sensor measures the temperature in the cultivation space.

The humidity sensor and the temperature sensor transmit information on the measured humidity and temperature to a controller. The controller controls the environment inside the cultivation space based on the information on the measured humidity and temperature.

A plurality of grooves are formed in the shelf 30. A water passage connected to the outside is formed in each of the grooves formed in the shelf 30. The water passage connected from the grooves of the shelf 30 to the outside is formed inside the shelf 30. The grooves of the shelf 30 have positions and sizes corresponding to a water flow guide 110, which will be described below. The water flow guide 110 is formed in the cultivation container 20. When the cultivation container 20 is seated on the shelf 30, the water flow guide 110 is inserted into the groove of the shelf 30.

Water is maintained at a predetermined height in the groove of the shelf 30. In addition, water introduced into the groove may be discharged to the outside of the main body 10.

Figure 2:
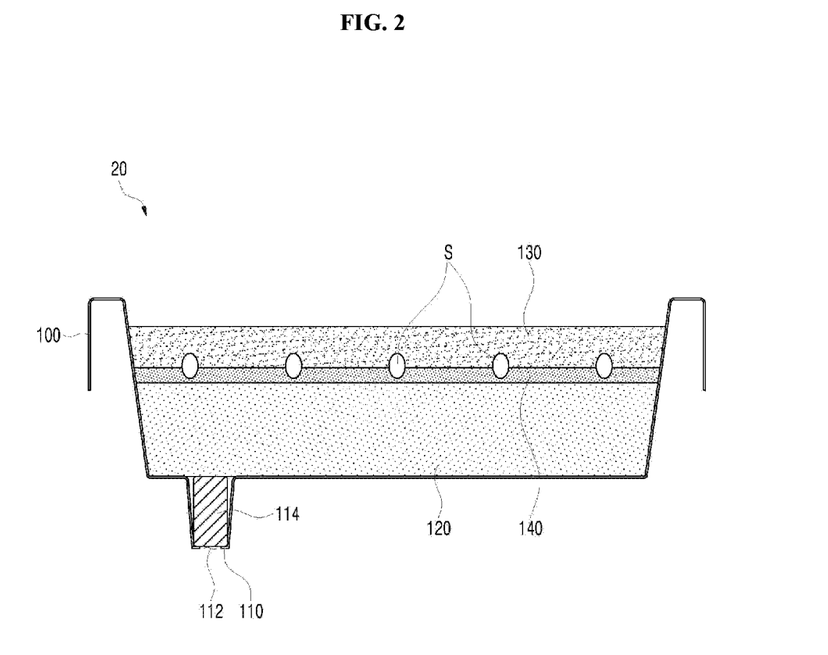
FIG. 2 is a cross-sectional view illustrating a cultivation container of a plant cultivating apparatus according to some embodiments of the present disclosure.

FIG. 2 is a cross-sectional view illustrating a cultivation container 20 of a plant cultivating apparatus according to some embodiments of the present disclosure.

The cultivation container 20 is placed on the shelf 30. The cultivation container 20 may be provided in plural number. In addition, a plurality of cultivation containers 20 may be placed on one shelf 30.

The cultivation container 20 is formed such that an upper side thereof is open.

The cultivation container 20 includes a case 100 and a water flow guide 110. In addition, the medium may further be contained inside the case 100.

The medium may be divided into a first medium 120, a second medium 130, and a sowing part 140.

The case 100 is formed as a container having a flat and wide bottom surface.

At least one water flow guide 110 is formed on a bottom surface of the case 100. Specifically, the water flow guide 110 protrudes downward from the bottom surface of the case 100.

The flow path guide 110 may have a shape corresponding to the groove of the shelf 30 as described above. The water flow guide 110 may be inserted into the groove of the shelf 30.

The groove of the shelf 30 and the water flow guide 110 may be provided in plural number, each of which may be arranged at positions corresponding to one another.

An opening 112, which is a through hole, is formed at the lower end of the water flow guide 110.

A direction in which the opening 112 is open may face downward, or may face a side of the water flow guide 110, according to the embodiment to which the present disclosure is applied.

The wick 114 is provided in an inner space of the water flow guide 110. The wick 114 is formed to be long in the vertical direction, and a lower end of the wick 114 is disposed adjacent to the opening 112. The wick 114 may be formed of a porous member. The wick 114 absorbs and holds water. When a portion of the wick 114 comes into contact with the water, an entire wick 114 is wetted with water through a capillary phenomenon.

Accordingly, when water is supplied to the lower end of the wick 114 that is adjacent to the opening 112, the water absorbed by the wick 114 moves upward.

Accordingly, when the water is supplied to the grooves of the shelf 30, the water is introduced into the opening 112 of the flow path guide 110. The water introduced into the opening 112 moves upward along the wick 114 and is supplied to the first medium 120, the sowing part 140, and the second medium 130.

Further, the wick 114 may contain a nutrient solution, which contains nutrients that help plants (crops) to grow. Accordingly, when the water passes through the wick 114, the nutrient solution is dissolved in the water. Then, the water containing the nutrient solution is supplied to the medium.

Figure 3:
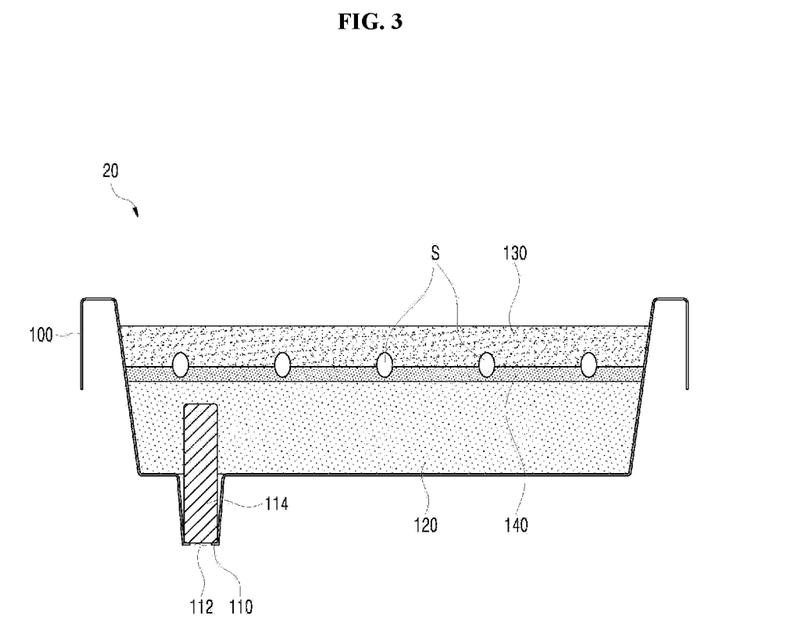
FIG. 3 is a cross-sectional view illustrating a state in which a wick is inserted into a first medium in a cultivation container of a plant cultivating apparatus according to some embodiments of the present disclosure.
Figure 4:
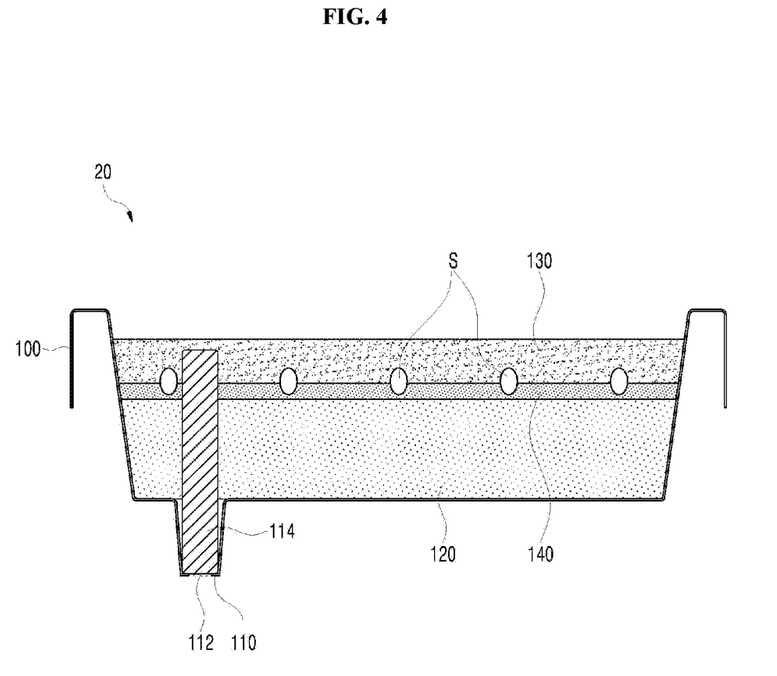
FIG. 4 is a cross-sectional view illustrating a state in which a wick is inserted into a second medium in a cultivation container of a plant cultivating apparatus according to some embodiments of the present disclosure.

FIG. 3 is a cross-sectional view illustrating a state in which a wick 114 is inserted into a first medium 120 in a cultivation container 20 of a plant cultivating apparatus according to some embodiments of the present disclosure. FIG. 4 is a cross-sectional view illustrating a state in which a wick 114 is inserted into a second medium 130 in a cultivation container 20 of a plant cultivating apparatus according to some embodiments of the present disclosure.

As illustrated in FIGS. 3 and 4, an amount of water supplied to the inside of the cultivation container 20 may be adjusted according to a length of the wick 114.

First, a medium contained in the cultivation container 20 includes a first medium 120, a second medium 130, and a sowing part 140. The medium may be soil. The medium contains nutrients required for the growth and development of plants. Alternatively, the medium may be a material having properties similar to soil. The first medium 120 is disposed in a lower portion of the cultivation container 20. The sowing part 140 covers a top surface of the first medium 120. Specifically, the sowing part 140 covers the entire top surface of the first medium 120. The second medium 130 covers a top surface of the sowing part 140. Specifically, the second medium 130 covers the entire top surface of the sowing part 140. Accordingly, the first medium 120, the sowing part 140, and the second medium 130 are stacked in that order.

In such a case, particles forming the second medium 130 are formed to be smaller in size than particles forming the first medium 120. This may further increase the effect of protecting and warming seeds located in the sowing part 140 by covering the seeds by the second medium 130. This also allows water to pass through the first medium 120 better than the layers above the first medium 120.

In addition, the second medium 130 is formed to have a thickness thinner than that of the sowing part 140. This may prevent the growth of the seeds from being disturbed by the second medium 130 while the seeds sown in the sowing part 140 germinate and sprout upward.

As illustrated in FIG. 3, when an upper end of the wick 114 is located inside the first medium 120, water introduced through the opening 112 is intensively supplied to the first medium 120.

In addition, as illustrated in FIG. 4, when the upper end of the wick 114 is disposed in the second medium 130, the water introduced through the opening 112 is evenly supplied to the first medium 120, the sowing part 140, and the second medium 130. In such a case, the upper end of the wick 114 has to be located inside the second medium 130 without extending beyond the upper end of the second medium 130. This prevents moisture contained in the wick 114 from evaporating to the outside of the cultivation container 20.

Figure 5:
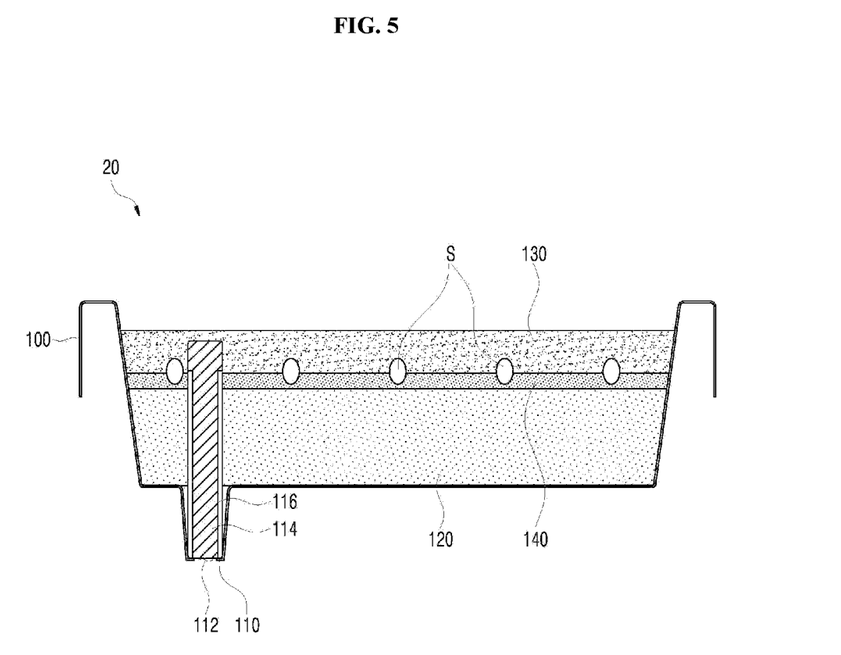
FIGS. 5 and 6 are cross-sectional views illustrating a state in which a wick directly supplies water to a second medium in a cultivation container of a plant cultivating apparatus according to some embodiments of the present disclosure.
Figure 6:
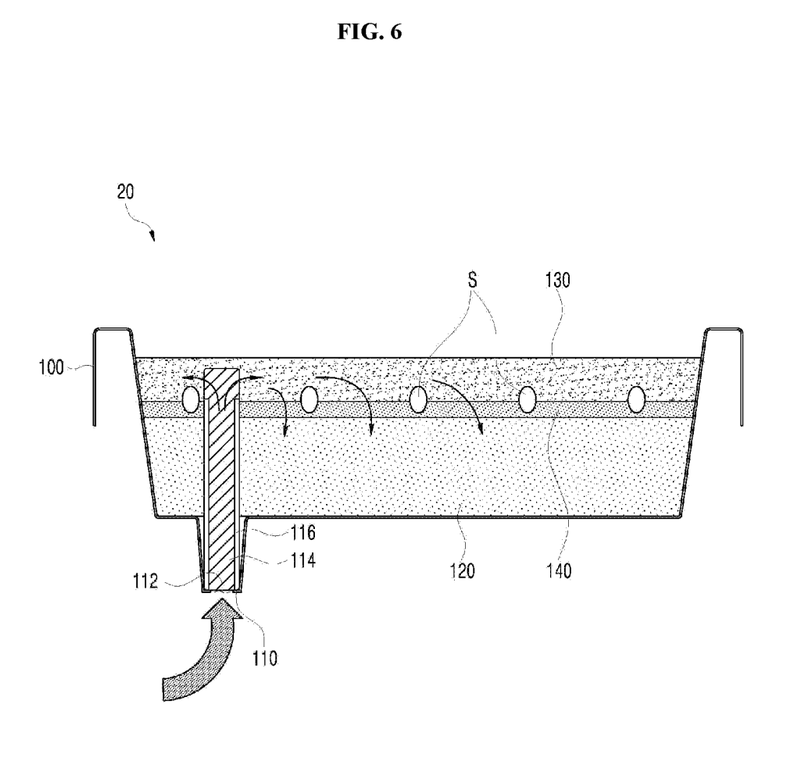

FIGS. 5 and 6 are cross-sectional views illustrating a state in which a wick 114 directly supplies water to a second medium 130 in a cultivation container 20 of a plant cultivating apparatus according to some embodiments of the present disclosure.

The wick 114 may further include a shield 116 surrounding an outer circumference thereof. The shield 116 surrounds a portion of the outer circumference of the wick 114 and prevents water contained in the wick 114 from moving to the outside of the wick 114. That is, since the shield 116 is formed of waterproof material, water is prevented from escaping to the outside of the wick 114 at an area of the wick 114 that is surrounded by the shield 116.

According to some embodiments of the present disclosure, the shield 116 surrounds the outer circumference of the wick 114 at a section where the wick 114 passes through the first medium 120 and the sowing part 140. Accordingly, the water contained in the wick 114 is not supplied to the first medium 120 and the sowing part 140. When the upper end of the wick 114 is located inside the second medium 130, the water supplied to the wick 114 through the opening 112 is directly supplied to the second medium 130 without being introduced into the first medium 120 and the sowing part 140. Accordingly, the water is intensively supplied to the second medium 130. In such a case, a relatively large amount of water may also be smoothly supplied to the sowing part 140 forming a layer immediately below the second medium 130.

According to some embodiments of the present disclosure, as described above, the medium contained in the cultivation container 20 is divided into the first medium 120, the second medium 130, and the sowing part 140, and thus the water may be selectively supplied to each of the first medium 120, the second medium 130, and the sowing part 140. In addition, as the second medium 130 covers the sowing part 140, the second medium 130 serves to maintain a constant temperature and humidity while protecting seeds planted in the sowing part 140.

The second medium 130 may be well-ventilated while creating an environment in which the seeds germinate, thereby preventing occurrence of the green algae.

In the preceding description, the embodiments of the present disclosure have been described with reference to the accompanying drawings, but these are exemplary. Therefore, the present disclosure should not be construed as being limited to the embodiments and drawings set forth herein. It will be apparent to those skilled in the art that various other changes and modifications can be made without departing from the spirit and scope of the disclosure. In addition, although not all actions or effects according to the configurations of the embodiments have been explicitly described, it is apparent that predictable actions or effects from the configurations should also be recognized as falling within the spirit and scope of the present disclosure.

Description of Symbols

10: Main body
20: Cultivation container
30: Shelf
100: Case
110: Water flow guide
112: Opening
114: Wick
116: Shield
120: First medium
130: Second medium
140: Sowing part

What is claimed is:

1. A plant cultivating apparatus comprising:
a main body that defines a cultivation space and includes a door configured to open or close the cultivation space;
at least one shelf that is disposed at the cultivation space; and
a cultivation container that is supported on the at least one shelf and is configured to receive water from or discharge water to the at least one shelf, wherein the cultivation container is configured to contain a medium,
wherein the cultivation container comprises:
a water flow guide that defines a conduit protruding downward from a bottom surface of the cultivation container, a lower end of the water flow guide defining an opening; and
a wick that is partially received in the water flow guide and configured to absorb water introduced through the opening of the lower end of the water flow guide and transport the water upward from a bottom of the wick, the wick including a first wick portion and a second wick portion, the first wick portion being surrounded by the conduit of the water flow guide between the bottom surface of the cultivation container and the lower end of the water flow guide, and the second wick portion extending upward from the water flow guide,
wherein the wick includes a nutrient solution that includes nutrients for growth of plants in water,
wherein the wick is configured to deliver the water supplied from the at least one shelf to a top layer of the medium at the cultivation container together with the nutrients,
wherein the medium comprises:
a first medium that is contained in the cultivation container,
a sowing part that covers a top surface of the first medium and is configured to allow seeds of plants to be planted, and
a second medium that defines the top layer of the medium and covers a top surface of the sowing part,
wherein the wick extends from the lower end of the water flow guide to the second medium below a top surface of the second medium,
wherein an upper end of the wick is located in the second medium, and
wherein the wick includes a shield that surrounds a portion of an outer circumference of the wick and that is impervious to water, the portion of the outer circumference of the wick passing through the first medium and the sowing part.

2. The plant cultivating apparatus of claim 1, wherein sizes of particles in the second medium are smaller than sizes of particles in the first medium.

3. The plant cultivating apparatus of claim 1, wherein the second medium is thinner than the sowing part in the cultivation container.

4. The plant cultivating apparatus of claim 1, wherein the at least one shelf includes a plurality of shelves that are spaced apart from one another in a vertical direction.

5. A plant cultivating apparatus comprising:
a main body that defines a cultivation space and is configured to control temperature and humidity in the cultivation space;
at least one shelf that is disposed at the cultivation space;
a cultivation container that is accommodated in the main body and is configured to contain a medium;
a water flow guide defining a conduit protruding downward from a bottom surface of the cultivation container; and
a wick that is disposed in the cultivation container and configured to absorb and transport water upward from a bottom of the wick, at least a portion of the wick being surrounded by the conduit of the water flow guide between the bottom surface of the cultivation container and a lower end of the water flow guide,
wherein the wick includes a nutrient solution that includes nutrients for growth of plants in water,
wherein the wick is configured to deliver the water supplied from the at least one shelf to a top layer of the medium at the cultivation container together with the nutrients,
wherein the cultivation container comprises:
a first medium that is disposed inside the cultivation container;
a sowing part that covers a top surface of the first medium and is thinner than the first medium; and
a second medium that defines the top layer of the medium and covers a top surface of the sowing part and is thinner than the sowing part,
wherein the wick extends from the first medium to the second medium below a top surface of the second medium,
wherein an upper end of the wick is located in the second medium, and
wherein the wick includes a shield that surrounds a portion of an outer circumference of the wick and that is impervious to water, the portion of the outer circumference of the wick passing through the first medium and the sowing part.

6. The plant cultivating apparatus of claim 5, wherein sizes of particles in the second medium are smaller than sizes of particles in the first medium.

* * * * *